United States Patent
Nalam et al.

(10) Patent No.: US 12,549,548 B2
(45) Date of Patent: Feb. 10, 2026

(54) SYSTEMS AND METHODS FOR NETWORK-ASSISTED AUTHENTICATION AND LOCATION SERVICES

(71) Applicant: Verizon Patent and Licensing Inc., Basking Ridge, NJ (US)

(72) Inventors: Rahul Nalam, Delaware, OH (US); Dante J. Pacella, Charles Town, WV (US); Ashish Sardesai, Ashburn, VA (US); David J. Strumwasser, Somerville, NJ (US); Sumanth S. Mallya, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 121 days.

(21) Appl. No.: 18/526,240

(22) Filed: Dec. 1, 2023

(65) Prior Publication Data

US 2025/0184325 A1    Jun. 5, 2025

(51) Int. Cl.
*H04L 9/40* (2022.01)
*H04L 67/51* (2022.01)
*H04L 67/52* (2022.01)
*H04L 67/75* (2022.01)

(52) U.S. Cl.
CPC ........ *H04L 63/0876* (2013.01); *H04L 63/108* (2013.01); *H04L 67/51* (2022.05); *H04L 67/52* (2022.05); *H04L 67/75* (2022.05)

(58) Field of Classification Search
CPC ... H04L 63/0876; H04L 63/108; H04L 67/51; H04L 67/52; H04L 67/75
USPC .............................................................. 726/4
See application file for complete search history.

(56) References Cited

U.S. PATENT DOCUMENTS

| | | | | |
|---|---|---|---|---|
| 11,374,875 | B1* | 6/2022 | Abhigyan | H04W 12/084 |
| 2015/0365403 | A1* | 12/2015 | Counterman | H04L 63/102 726/9 |
| 2017/0171187 | A1* | 6/2017 | Yin | H04L 63/083 |
| 2024/0422535 | A1* | 12/2024 | Balmakhtar | H04W 12/40 |

* cited by examiner

*Primary Examiner* — Khoi V Le

(57) ABSTRACT

A system described herein may receive a first authentication request that includes a first identifier of a User Equipment ("UE"), and a second identifier of a second device. The system may output a second authentication request to a wireless network with which the UE is associated, which may include the first identifier of the UE. The system may receive, in response to the second authentication request an indication that the UE has been authenticated, and location information associated with the UE. The system may identify one or more services associated with the received location of the UE, and may output, to the second device and based on the response to the second authentication request, traffic associated with the identified one or more services.

20 Claims, 11 Drawing Sheets

SYSTEMS AND METHODS FOR NETWORK-ASSISTED AUTHENTICATION AND LOCATION SERVICES

BACKGROUND

Service providers may provide services to User Equipment ("UEs"), such as mobile telephones, tablets, Internet of Things ("IT") devices, Machine-to-Machine ("M2M") devices, via wireless networks. Such services may include content streaming services, gaming services, videoconferencing services, application services, or the like. The services may be tied to specific users or accounts, in order to provide a personalized experience and maintain security of the users. Situations may arise in which a user, who is registered for a service, wishes to access the service via a device that has not previously been used by the user, such as a smart television in a hotel room, a friend or family member's device, or the like.

DETAILED DESCRIPTION OF EXAMPLE EMBODIMENTS

Figure 1:
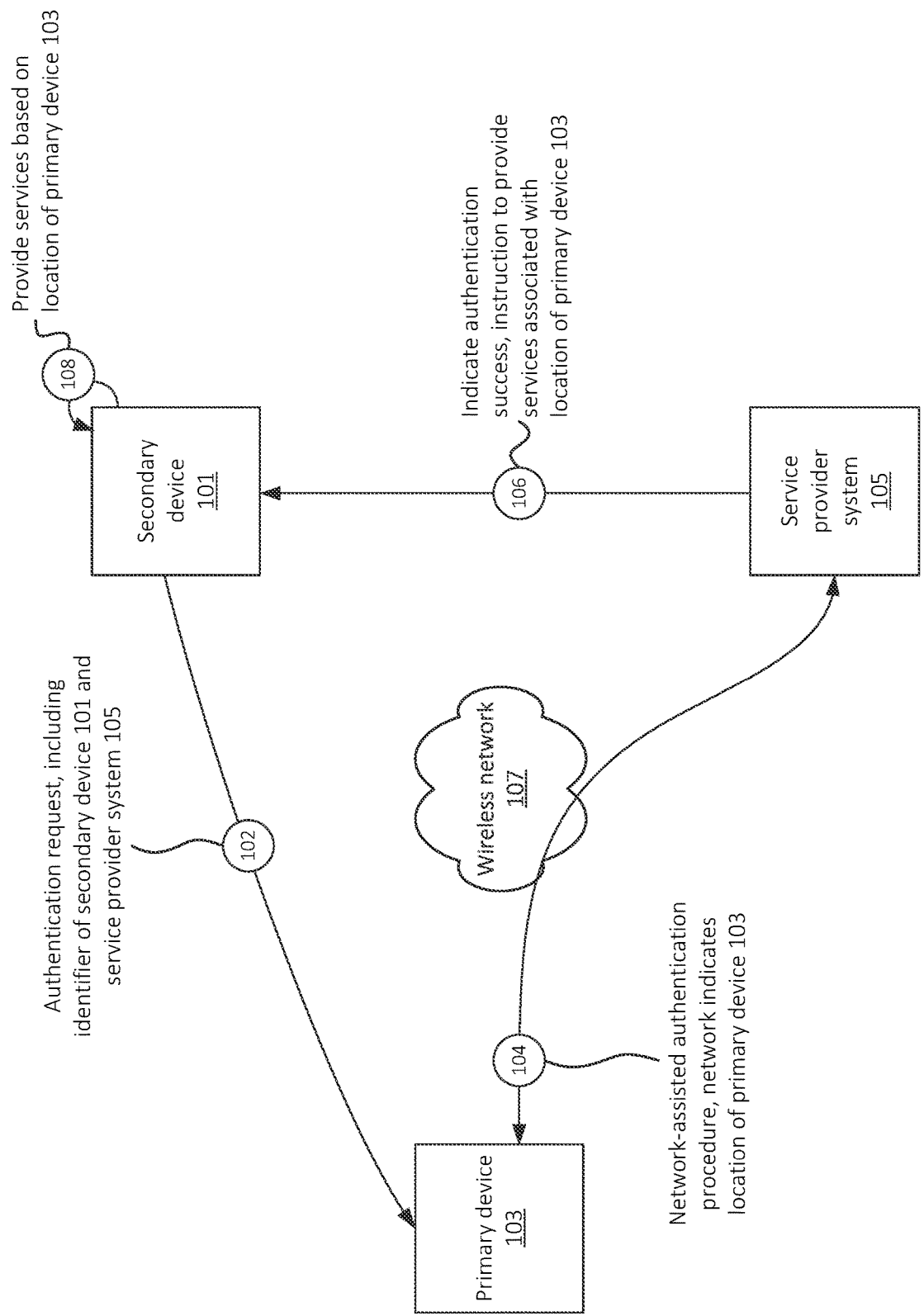
FIG. 1 illustrates an example overview of one or more embodiments described herein.

The following detailed description refers to the accompanying drawings. The same reference numbers in different drawings may identify the same or similar elements.

UEs, such as smartphones, may be registered or provisioned with a wireless network. The wireless network may maintain authentication information associated with UEs and/or otherwise may participate in conjunction with UEs to perform authentication procedures by which UEs may be authenticated. For example, UEs may include SIM ("Subscriber Identification Module") cards or other suitable mechanisms that may be used to communicate with wireless networks in order to authenticate the UEs. UEs may communicate with service provider systems, such as web servers, network-accessible resources, or the like, in order to receive services provided by such service provider systems. For example, a UE may execute an application, implement an application programming interface ("API"), etc. via which the UE communicates with a service provider system via a network to send and receive traffic associated with services provided by the service provider system.

A user accessing services provided by a service provider system may provide authentication credentials, such as a username and password, which may be used by the service provider system to authenticate the user before providing services to the user via a UE. Some service provider systems may make use of authentication tokens or other suitable mechanisms in order to remove the need for the same user to be authenticated repeatedly when the user is accessing services provided by the service provider system via the same UE (e.g., the user's personal device). Situations may arise in which the user wishes to access a service provided by a service provider system via some other UE, such as a device belonging to another individual, a device installed at a facility (e.g., in a hotel room, a conference room, an office, etc.), or some other UE that does not necessarily maintain an authentication token indicating that the user has been authenticated and authorized to use such UE for accessing services provided by the service provider.

Embodiments described herein provide for network-assisted authentication procedures for secondary devices (e.g., UEs that have not received authentication tokens from a service provider system) to be authenticated on behalf of users for which a primary device has been established (e.g., UEs that have previously received authentication tokens and/or have otherwise been authenticated by or registered with service provider systems). Such embodiments allow for service provider systems to verify that access requests from secondary devices are associated with authorized users (e.g., individuals in possession of primary devices that have previously been registered with such service provider systems). The network-assisted authentication procedure may include or may implement a Silent Network Authentication ("SNA") procedure or other suitable procedure in which a wireless network, with which UE is registered or provisioned, indicates (e.g., to a service provider system) that such UE has been authenticated by the wireless network.

The services provided by some service providers may be location-based or region-based. For example, certain content may be restricted in certain regions, backend server selection or routing may be performed based on location or region of a UE receiving a service, etc. Some devices, used as secondary devices as described herein, may not have location determination capability, may be connected to Virtual Private Networks ("VPNs"), or may otherwise be associated with locations that are not readily determined by service provider systems. The network-authentication procedure discussed herein may further be used to indicate, to a service provider system, the location of a primary device used in the network-assisted authentication procedure. The service provider system may use the location of the primary device to reliably determine or designate the location of the secondary device, and to provide location-based services via the secondary device without the need for the secondary device to provide location information.

In some embodiments, as discussed below, the network-assisted authentication procedure may include indicating a telephone number (e.g., an Mobile Directory Number ("MDN")) or other suitable identifier to the service provider system, such that the service provider system may verify that the primary being used for the authentication procedure has been previously registered with the service provider system. On the other hand, in some embodiments, the network-assisted authentication procedure may be anonymous as to the identity of the primary device, thus maintaining privacy of the user while still providing authentication and location services with respect to the service provided by the service provider system.

As shown in FIG. 1, secondary device 101 may output (at 102) an authentication request to primary device 103. For example, secondary device 101 may display a quick response ("QR") code that is identified by primary device 103 via a camera of primary device 103, where such QR code indicates an authentication request. As another example, secondary device 101 and primary device 103 may implement an Near Field Communication ("NFC") protocol, in which secondary device 101 provides the authentication request to primary device 103 via a "tap" or other proximity-based mechanism. As yet another example, secondary device 101 may display a Uniform Resource Locator ("URL") that may be input to primary device 103 via a keyboard. In practice, secondary device 101 may provide the authentication request to primary device 103 in some other suitable manner.

As discussed herein, the authentication request may include an identifier of secondary device 101. In some embodiments, as discussed below, the identifier of secondary device 101 may be maintained by secondary device 101 and service provider system 105, such that service provider system 105 is "aware" of particular identifiers of different respective secondary devices 101. The identifier of secondary device 101 may be encoded in a QR code displayed by secondary device 101, encoded in a wireless communication provided to primary device 103 (e.g., via an NFC tap), displayed on a display device of secondary device 101, or otherwise provided by secondary device 101 to primary device 103. In some embodiments, the authentication request may also include an identifier of service provider system 105 and/or communication information based on which primary device 103 may communicate with service provider system 105, such as a URL associated with service provider system 105, a Uniform Resource Identifier ("URI"), or other suitable identifier.

Primary device 103 may use the provided identifiers of secondary device 101 and service provider system 105 as part of a network-assisted authentication procedure (at 104) between primary device 103, wireless network 107, and service provider system 105. For example, primary device 103 may provide, to wireless network 107, an indication that primary device 103 has received the authentication request from secondary device 101, where such indication includes the identifier of secondary device 101 and the identifier of service provider system 105. In some embodiments, the network-assisted authentication procedure may include wireless network 107 authenticating primary device 103, in which primary device 103 may utilize a SIM card installed at primary device 103 and/or may participate in some other suitable authentication procedure with wireless network 107. In this manner, wireless network 107 may authenticate primary device 103.

Wireless network 107 may also provide (at 104) an indication, to service provider system 105, that primary device 103 has been authenticated by wireless network 107. Wireless network 107 may utilize the identifier of service provider system 105, as provided by primary device 103, in order to communicate with service provider system 105. That is, the identifier of service provider system 105, as provided by primary device 103, may indicate to wireless network 107 that the network-assisted authentication procedure should be reported to service provider system 105 as opposed to some other device or system. Service provider system 105 may also receive, as part of the network-assisted authentication procedure, the identifier of secondary device 101. In this manner, service provider system 105 may be made "aware" that the network-assisted authentication procedure is for access to secondary device 101.

The network-assisted authentication procedure may also include providing, by wireless network 107, location information of primary device 103. For example, the location information may indicate latitude and longitude coordinates, the name of a city or state, a Tracking Area Identifier ("TAI"), or other suitable location information. In this manner, service provider system 105 may be able to ascertain a location of primary device 103, and may further determine a location of secondary device 101 based on the indicated location of primary device 103. For example, service provider system 105 may determine that the same location, provided for primary device 103, is the location of secondary device 101. Additionally, or alternatively, service provider system 105 may perform a lookup or mapping procedure, in which service provider system 105 determines that the location of primary device 103 (e.g., latitude and longitude coordinates) corresponds to another type of location (e.g., the name of a city, state, province, or country).

In some embodiments, wireless network 107 may further determine whether primary device 103 is connected to wireless network 107, is powered on, is reachable via wireless network 107, and/or is in some other operational status. In some embodiments, wireless network 107 may provide an indication of the operational status of primary device 103 (e.g., connected, not connected, powered on, not powered on, reachable, unreachable, etc.), and service provider system 105 may further determine whether to grant access via secondary device 101 based on the operational status of primary device 103. For example, service provider system 105 may deny access when wireless network 107 indicates that primary device 103 is in a given operational state (e.g., powered off, not connected, etc.), or may allow access when wireless network 107 indicates that primary device 103 is in another operational state (e.g., powered on, connected, etc.). In some embodiments, wireless network 107 may provide the operational status of primary device 103 as part of the network-assisted authentication procedure. In some embodiments, service provider system 105 may separately request the operational status of primary device 103 (e.g., separate from the network-assisted authentication procedure).

In some embodiments, when providing the indication to service provider system 105 that primary device 103 has been authenticated, wireless network 107 may forgo providing a telephone number or other identifier of primary device 103. In such instances, service provider system 105 may be able to authenticate the request associated with secondary device 101 and further determine the location of secondary device 101, without receiving identifying information of primary device 103 itself.

In some embodiments, the network-assisted authentication procedure may include, or may be performed in conjunction with, an authentication procedure between primary device 103 and service provider system 105, whereby service provider system 105 verifies that primary device 103 is associated with a particular user or account (e.g., which has been previously registered with service provider system 105). For example, primary device 103 may provide a user name and password, may provide an authentication token previously provided by service provider system 105, and/or may otherwise participate in an authentication procedure with service provider system 105.

In some embodiments, wireless network 107 may provide an identifier of primary device 103, such as an MDN, to service provider system 105. In such instances, service provider system 105 may be able to authenticate a user or account of primary device 103 (e.g., where such user or account has previously registered with service provider system 105 as being associated with the MDN of primary device 103), without requiring the user to enter authentication credentials (e.g., user name and password) as part of the authentication procedure (at 104). That is, service provider system 105 may authenticate the account or user based on the MDN provided by wireless network 107 pursuant to the network-assisted authentication procedure, and may associate the authenticated user or account with secondary device 101 based on the identifier of secondary device 101 provided by primary device 103.

In some embodiments, different variations on the network-assisted authentication procedure are possible. For example, in some embodiments, the network-assisted authentication procedure may include primary device 103 requesting an authentication token from wireless network 107 and providing the authentication token to service provider system 105. Such authentication token may include an identifier of network 107 (e.g., a Public Land Mobile Network ("PLMN") identifier or other suitable identifier) and/or of a device or system of network 107 with which service provider system 105 may communicate to validate the authentication token and receive location information for primary device 103, thus authenticating primary device 103 and indicating the location of primary device 103 to service provider system 105. In practice, other variations on the network-assisted authentication procedure, in which service provider system 105 receives an indication that wireless network 107 has authenticated the identity (e.g., MDN) and location of primary device 103, and is further able to associate such authentication of primary device 103 with secondary device 101.

Assuming service provider system 105 determines (at 104) that primary device 103 is authenticated, service provider system 105 may indicate (at 106) authentication success to secondary device 101. For example, service provider system 105 may utilize the provided identifier of secondary device 101 to determine that secondary device 101 (e.g., as opposed to some other device or system) should receive the indication that primary device 103 (and/or an associated user or account) has been authenticated. Service provider system 105 may additionally, or alternatively, provide (at 106) an instruction to secondary device 101, to enable or provide services (e.g., that the user or account has been successfully authenticated). As discussed above, such services may include content streaming services, gaming services, etc. that are provided via one or more applications executing at secondary device 101. Once secondary device 101 receives the instruction from service provider system 105, secondary device 101 may proceed to provide (at 108) the services. As discussed above, the services may include location-based services, and the providing of the services by service provider system 105 (e.g., via secondary device 101) may include providing the services based on the location of primary device 103 as indicated by wireless network 107.

Figure 2:
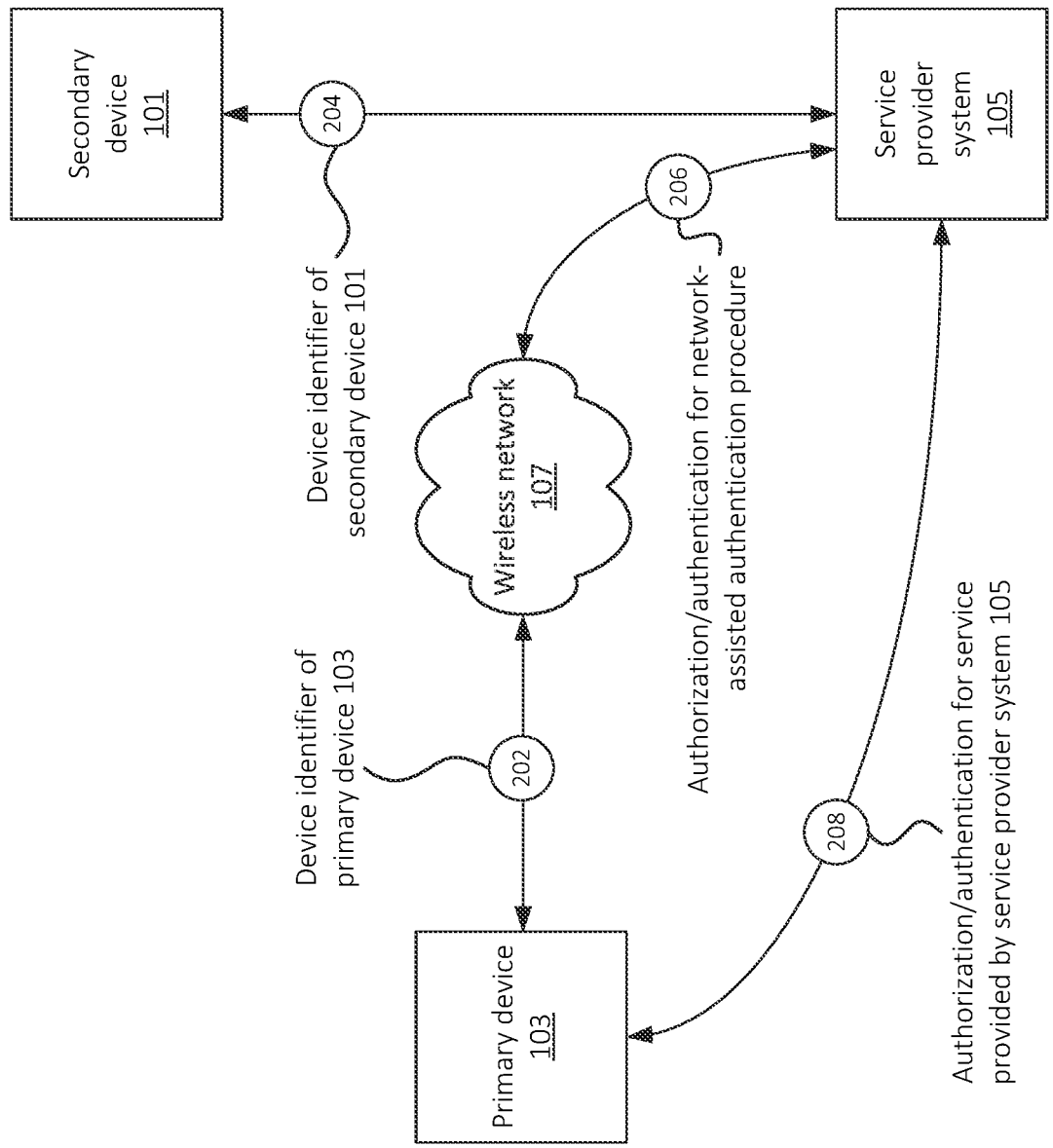
FIG. 2 illustrates example registration procedures, in accordance with some embodiments.

FIG. 2 illustrates example registration operations that may be used in the operations described above with respect to FIG. 1. As shown, primary device 103 and network 107 may participate in a registration and/or provisioning procedure (at 202), in which network 107 and/or primary device 103 receive or maintain one or more identifiers of primary device 103. Such identifiers may include an MDN, an International Mobile Subscriber Identity ("IMSI"), an International Mobile Station Equipment Identity ("IMEI"), a Subscription Permanent Identifier ("SUPI"), a Globally Unique Temporary Identifier ("GUTI"), etc. Wireless network 107 may include, or may be communicatively coupled to, a provisioning system or other suitable system that assigns an MDN or other types of identifiers to primary device 103.

As further shown, secondary device 101 and service provider system 105 may participate in a registration and/or provisioning procedure (at 204), in which secondary device 101 and/or service provider system 105 receive and/or maintain an identifier of secondary device 101. Secondary device 101 may, for example, execute an application, implement an API, and/or otherwise communicate with service provider system 105 (e.g., via a network such as the Internet). Service provider system 105 may generate, select, and/or otherwise assign the identifier to secondary device 101. The identifier, provided based on secondary device 101, may be unique with respect to other devices for which service provider system 105 assigns identifiers. In this manner, service provider system 105 may be able to distinguish between secondary device 101 and other devices on the basis of such identifiers.

Wireless network 107 and service provider system 105 may also participate (at 206) in a registration procedure, in which wireless network 107 and service provider system 105 establish authorization for service provider system 105 to participate in network-assisted authentication procedures for primary device 103 and/or other devices. Service provider system 105 may communicate with wireless network 107 via a Network Exposure Function ("NEF"), Service Capability Exposure Function ("SCEF"), or other suitable interface or communication pathway. Service provider system 105 may include or may be communicatively coupled to one or more authentication systems that maintain authentication information for service provider system 105 and/or that provide authentication services with respect to primary device 103.

Primary device 103 and service provider system 105 may also participate (at 208) in an authorization and/or authentication procedure, in which primary device 103 and service provider system 105 establish authorization for primary device 103 to receive services provided by service provider system 105. For example, a user associated with a particular account, as maintained by service provider system 105, may provide a username and password or otherwise provide authentication credentials, as well as an instruction to associate primary device 103 with the user or account. In this manner, service provider system 105 may maintain information associating primary device 103 with the user or account.

In some embodiments, service provider system 105 may also receive one or more identifiers of primary device 103, such as an MDN, as part of the authorization and/or authentication procedure (at 208). In some embodiments, multiple devices may be registered as primary devices 103 for the same user or account. For example, a particular user may register a laptop computer as a first primary device 103, a mobile phone as a second primary device 103, a family member's tablet as a third primary device 103, and so on. In such scenarios, service provider system 105 may maintain information associating such multiple primary devices 103 with the user or account.

Figure 3:
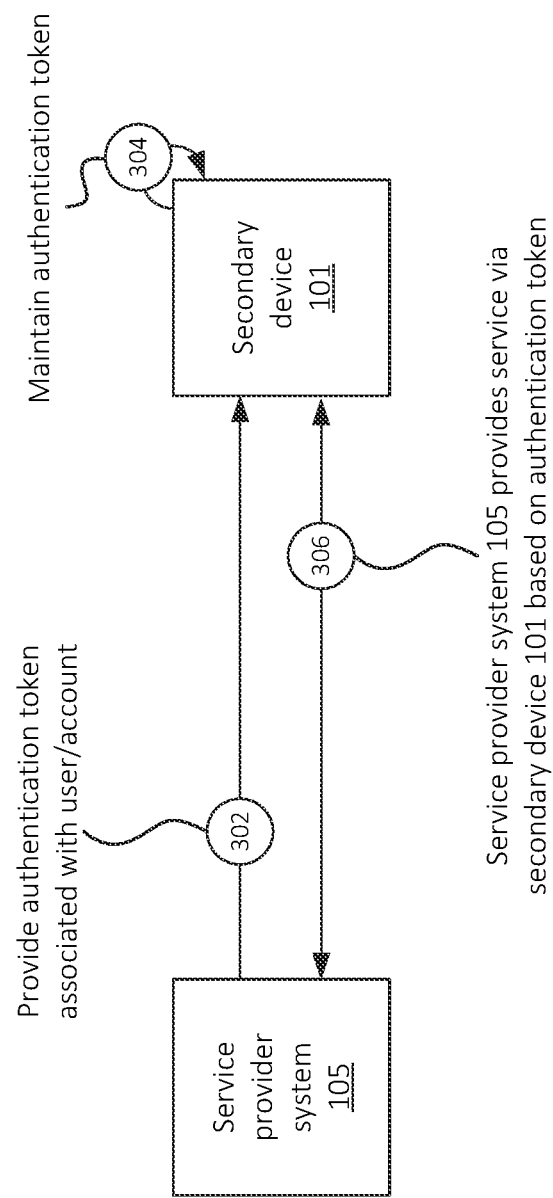
FIG. 3 illustrates an example of providing services via a secondary device based on a network-assisted authentication procedure, in accordance with some embodiments.

FIG. 3 illustrates an example of providing services via secondary device 101 based on a network-assisted authentication procedure performed between service provider system 105 and wireless network 107. As shown, once the network-assisted authentication procedure (at 104) has been completed, service provider system 105 may provide an authentication token, associated with the particular user and/or account for which the network-assisted authentication procedure was performed, to secondary device 101. In this manner, secondary device 101 may be made "aware" that service provider system 105 has approved the providing of services for the particular user and/or account. For example, the user and/or account may be "logged in" to an application executing at secondary device 101 based on the authentication token received (at 302) from service provider system 105.

Secondary device 101 may maintain (at 304) the authentication token, and may use the authentication token when communicating (at 306) with service provider system 105 in order to provide the service. For example, secondary device 101 may include the authentication token in service requests or other suitable communications to service provider system 105, and service provider system 105 may provide communications associated with the service to secondary device 101 based on receiving the authentication token. In this manner, a user accessing the service via secondary device 101 does not need to initiate or participate in any additional authentication procedures, as the authentication token is used by secondary device 101 and service provider system 105 to maintain the authentication of the user or account. As discussed below, the authentication token may be associated with rules, policies, and/or other parameters based on which the authentication token may be dynamically provided, revoked, etc.

Figure 4:
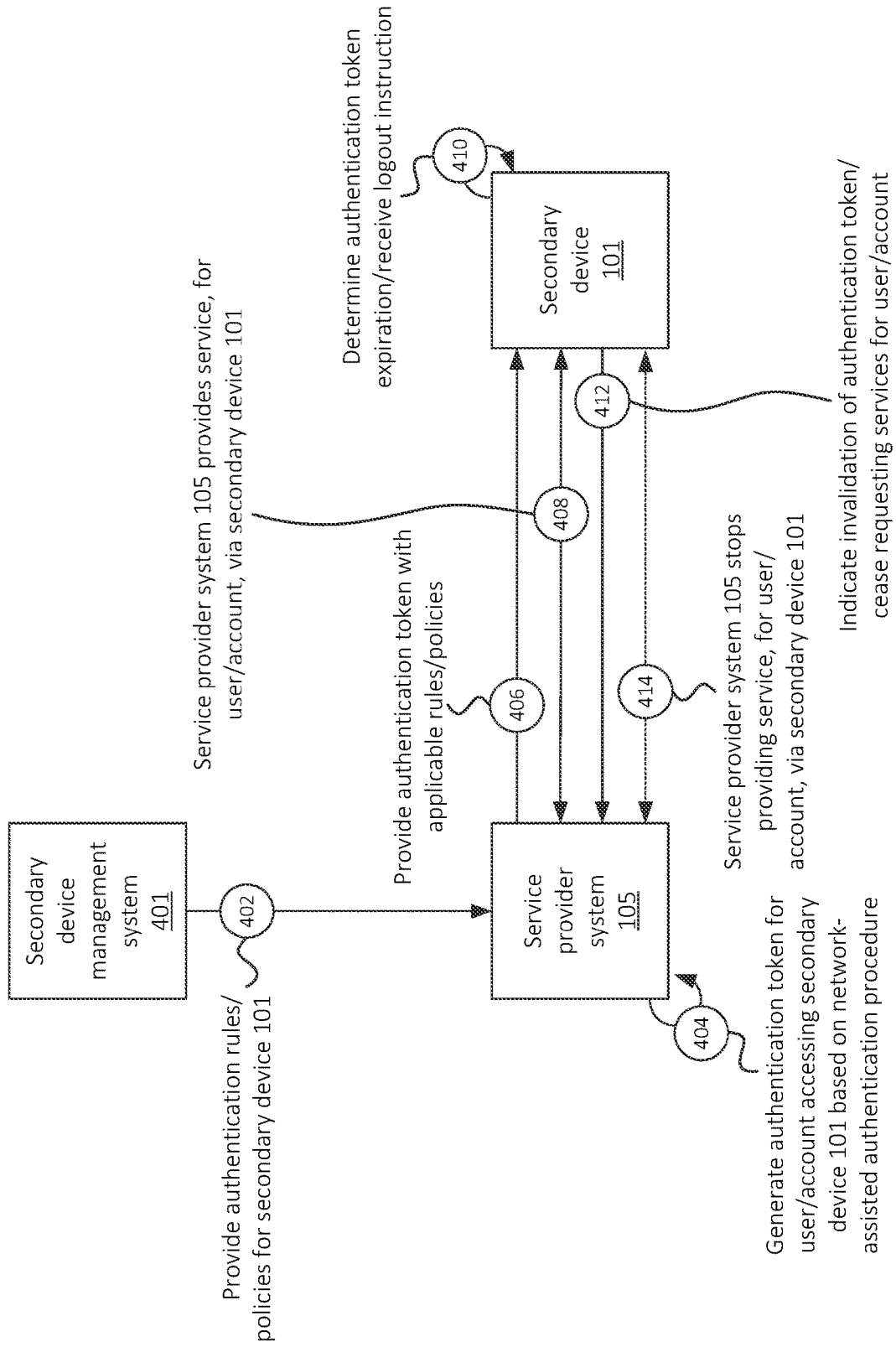
FIGS. 4 and 5 illustrate examples of selectively providing services via a secondary device, in accordance with some embodiments.

As shown in FIG. 4, for example, secondary device management system 401 may provide (at 402) a set of authentication rules and/or policies, for secondary device 101, to service provider system 105. Secondary device management system 401 may have registered with secondary device 101 and/or service provider system 105, such that service provider system 105 is able to ascertain that secondary device management system 401 is authorized to provide such rules and/or policies on behalf of secondary device 101. Additionally, or alternatively, secondary device 101 and/or some other suitable device or system may provide the rules and/or policies associated with secondary device 101. In some embodiments, such rules and/or policies may indicate authentication token durations, such as a policy that authentication tokens provided by service provider system 105 to secondary device 101 have a particular duration (e.g., 24 hours, 48 hours, etc.), after which such authentication tokens are no longer valid. In some embodiments, the rules and/or policies may be updated periodically or on some other ongoing basis, such that one authentication token provided by service provider system 105 to secondary device 101 may have a different duration or other invalidation criteria as another token provided by service provider system 105 to secondary device 101. For example, secondary device management system 401 may provide (at 402) the authentication rules and/or policies for secondary device 101 and/or one or more other suitable devices on a periodic or otherwise ongoing basis.

Service provider system 105 may generate (at 404) an authentication token, associated with a particular user and/or account, and further associated with secondary device 101, based on a network-assisted authentication procedure, as discussed above. As similarly discussed above, service provider system 105 may provide (at 406) the authentication token to secondary device 101. For example, as discussed above, the network-assisted authentication procedure may include an identifier of secondary device 101, based on which service provider system 105 may identify that the authentication token is associated with secondary device 101. Secondary device 101 may use the authentication token to provide services associated with the user and/or account. For example, secondary device 101 may send and/or receive (at 408) traffic, to and/or from service provider system 105, that is associated with the provided services. In some embodiments, service provider system 105 may provide (at 406) the applicable rules and/or policies associated with secondary device 101. For example, service provider system 105 may indicate a time of expiration, a duration of validity, and/or one or more other conditions or criteria based on which the authentication token is valid or invalid.

At some point, secondary device 101 may determine (at 410) that the authentication token is no longer valid, such as determining that the time of expiration of the authentication token has occurred, that the duration of validity has elapsed, and/or that other suitable conditions or criteria have been met based on which the authentication token is invalid. Additionally, or alternatively, secondary device 101 may receive at logout instruction (e.g., via an application executing at secondary device 101), such as a user selection of an option to logout or otherwise invalidate the previously performed network-assisted authentication of secondary device 101.

Secondary device 101 may accordingly output (at 412), to service provider system 105, an indication that the authentication token has been invalidated. Additionally, or alternatively, secondary device 101 may cease requesting services from service provider system 105 and/or may otherwise cease communicating with service provider system 105 to provide the service. For example, certain conditions or criteria may not be detectable by service provider system 105, or service provider system 105 may otherwise be configured to provide the service until secondary device 101 indicates (at 412) that the authentication token is no longer valid (e.g., based on the authentication rules and/or policies). Service provider system 105 may accordingly stop (at 414) providing the service via secondary device 101.

Figure 5:
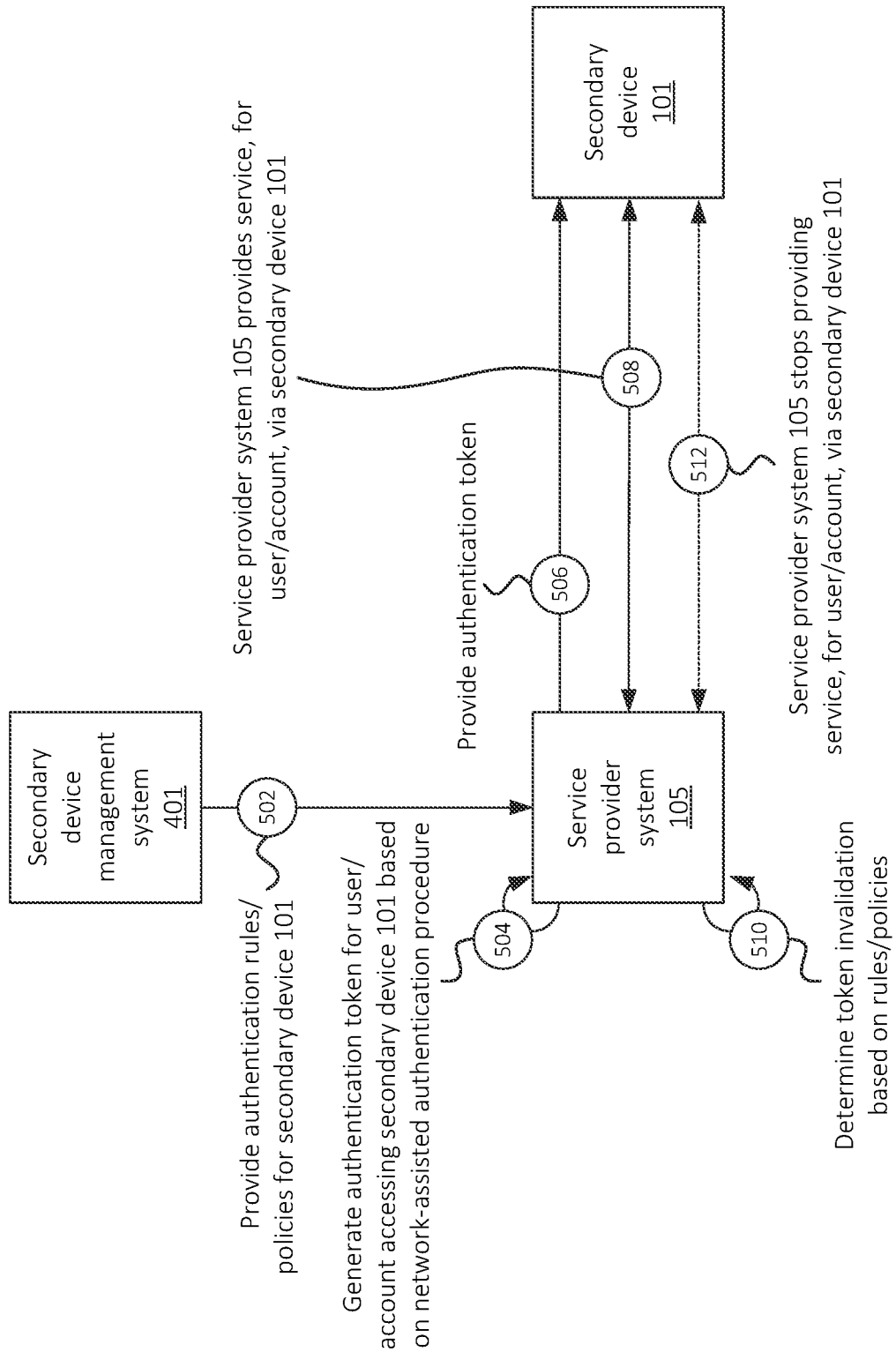

As shown in FIG. 5, service provider system 105 may also initiate an invalidation of an authentication token (e.g., without a request from secondary device 101 to invalidate the authentication token). For example, as similarly noted above, service provider system 105 may receive (at 502) a set of authentication rules and/or policies for a given secondary device 101, and may generate (at 504) an authentication token based on a network-assisted authentication procedure as discussed above. Service provider system 105 may further provide (at 506) the authentication token to secondary device 101, and secondary device 101 may communicate (at 508) with service provider system 105 in order to provide a service to a user of secondary device 101. At some point, service provider system 105 may determine (at 510) that the token is invalid based on the rules and/or policies provided (at 502), such as a determination that a duration of the token has exceeded a threshold duration, that an invalidation instruction has been received (e.g., from secondary device management system 401), that a logout request associated with the user or account has been received (e.g., from primary device 103), and/or that the token is otherwise no longer valid. As another example, service provider system 105 may invalidate the authentication token based on an operational status of primary device 103 (e.g., primary device 103 has been disconnected from wireless network 107 for at least a threshold duration of time), in which service provider system 105 may periodically or otherwise on an ongoing basis communicate with wireless network 107 in order to determine the operational status of primary device 103.

Based on determining that the token is no longer valid, service provider system 105 may stop (at 512) providing the service to secondary device 101. For example, service provider system 105 may reject requests associated with the service from secondary device 101, may output an indication to secondary device 101 that the authentication token is no longer valid, and/or may otherwise no longer provide the service via secondary device 101.

Figure 6:
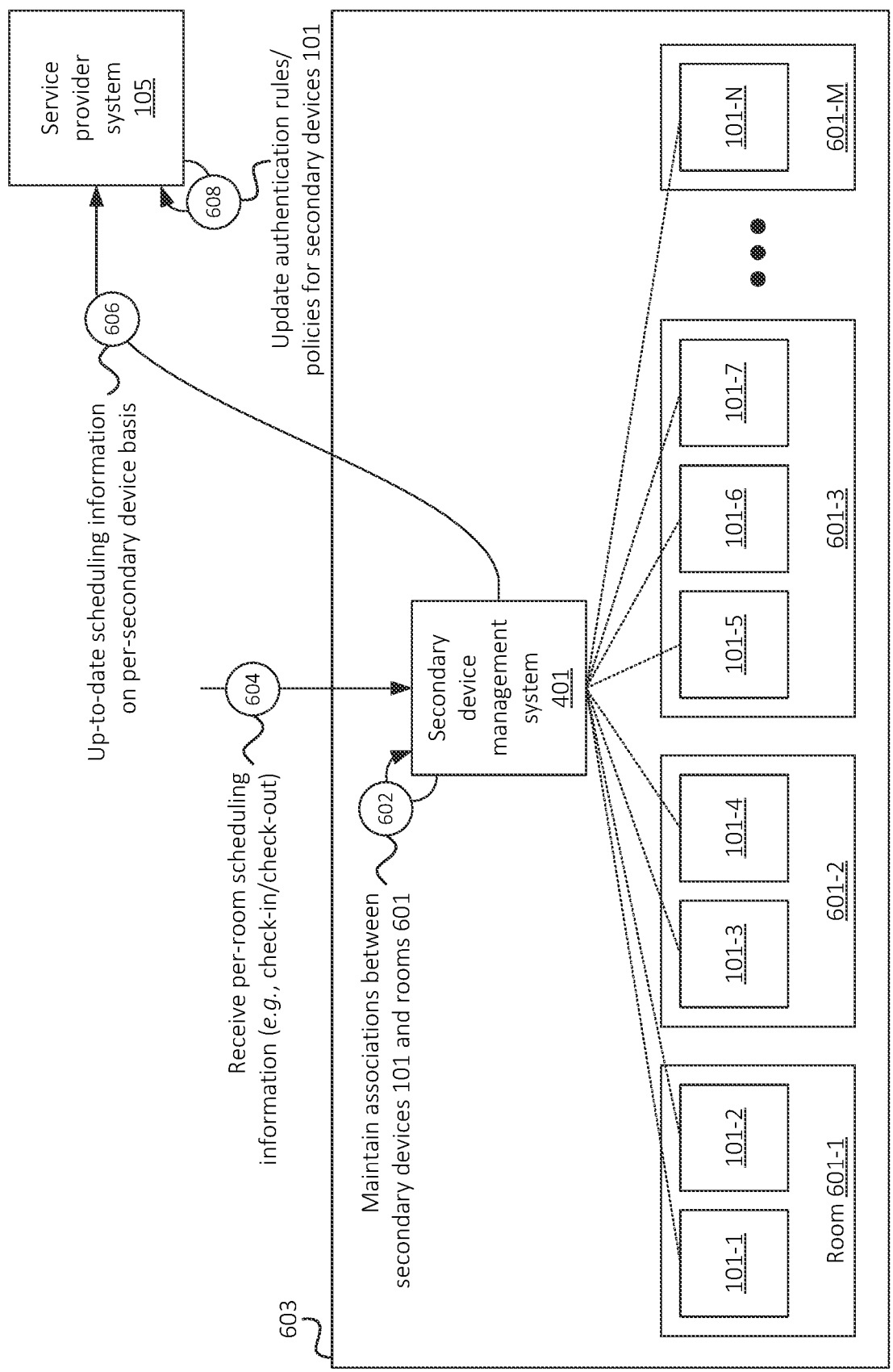
FIG. 6 illustrates an example of dynamically updating authentication rules and/or policies for groups of secondary devices, in accordance with some embodiments.

FIG. 6 illustrates an example of dynamically updating authentication rules and/or policies on ongoing basis, such that individual secondary devices 101 (or groups of secondary devices 101) may be authenticated for suitable durations of time. In this example, secondary devices 101 may be associated with (e.g., located in) rooms 601 of a particular hotel 603. For example, secondary devices 101-1 and 101-2 may be located in room 601-1, secondary devices 101-3 and 101-4 may be located in room 601-2, secondary devices 101-5, 101-6, and 101-7 may be located in room 601-3, and secondary device 101-N may be located in room 601-M. Secondary devices 101 may be, may include, may be implemented by, or may be communicatively coupled to devices such as smart televisions, smart picture frames, teleconferencing devices, gaming consoles, streaming devices, etc.

Secondary device management system 401 may be associated with hotel 603. For example, secondary device management system 401 may be located in hotel 603, and/or may be executed by a network-accessible resource (e.g., a web server, web portal, etc.) that may be communicatively coupled to a workstation or other suitable device or system associated with hotel 603. Secondary device management system 401 may determine identifiers of respective secondary devices 101. For example, secondary device management system 401 may determine such identifiers by scanning QR codes displayed by secondary device management systems 401, communicating with secondary device management systems 401 via an API or application, or otherwise determining the identifiers. In some embodiments, secondary device management system 401 may communicate with service provider system 105 to determine identifiers of respective secondary devices 101. For example, secondary device management system 401 may provide an API, application, etc. whereby secondary device management system 401 may register an association between secondary device management system 401 and secondary devices 101 (e.g., where such association indicates that secondary device management system 401 is authorized to provide rules and/or policies related to such secondary devices 101).

Secondary device management system 401 may also maintain (at 602) an association between respective secondary devices 101 and rooms 601. For example, an administrator, operator, etc. of hotel 603 may provide an indication that secondary devices 101-1 and 101-2 are located in room 601-1, and so on. In this manner, secondary device management system 401 may be "aware" of which secondary devices 101 are located in which rooms 601.

Secondary device management system 401 may further receive (at 604) per-room scheduling information, which may include scheduled check-in times, scheduled check-out times, actual check-in times, actual check-out times, etc. For example, an individual may book room 601-2 for three days, and the scheduling information for room 601-2 may indicate a time on the first day that the individual is scheduled to check in as well as a time on the third day that the individual is scheduled to check out. Additionally, or alternatively, the scheduling information may indicate a time that the individual actually checked in to room 601-2 or arrived at hotel 603, and/or a time that the individual actually checked out of or left room 601-2.

Secondary device management system 401 may provide (at 606), on an ongoing basis, up-to-date scheduling information to service provider system 105 for one or more secondary devices 101. For example, secondary device management system 401 may indicate, to service provider system 105, the scheduled check-in and/or check-out times for secondary devices 101-3 and 101-4, without indicating that such secondary devices 101 are associated with any particular room or individual. In some embodiments, secondary device management system 401 may further provide an indication that authentication of secondary devices 101-3 and 101-4 should be linked together. For example, the authentication of one device would indicate the authentication of the other.

In this manner, service provider system 105 may be able to update (at 608) rules and/or policies associated with secondary devices 101-3 and 101-4 and account sharing thereof, without the anonymity or whereabouts (e.g., the particular room 601-2) of the individual using secondary devices 101-3 and 101-4 being compromised. As discussed above, service provider system 105 may use such rules and/or policies when performing a network-assisted authentication procedure.

For example, in some embodiments, since secondary device management system 401 indicated (at 606) that secondary devices 101-3 and 101-4 are linked, service provider system 105 may issue an authentication token to both secondary devices 101-3 and 101-4 when one (i.e., secondary device 101-3 or secondary device 101-4) of them are used for a network-assisted authentication procedure described above. Further, upon expiration of the authentication token (e.g., based on the scheduled or actual check-out of the individual from room 601-2), service provider system 105 may revoke or invalidate the authentication tokens for both secondary devices 101-3 and 101-4. In this manner, an individual subsequently staying in room 601-2 would not have access to the account of the individual previously staying in room 601-2.

Figure 7:
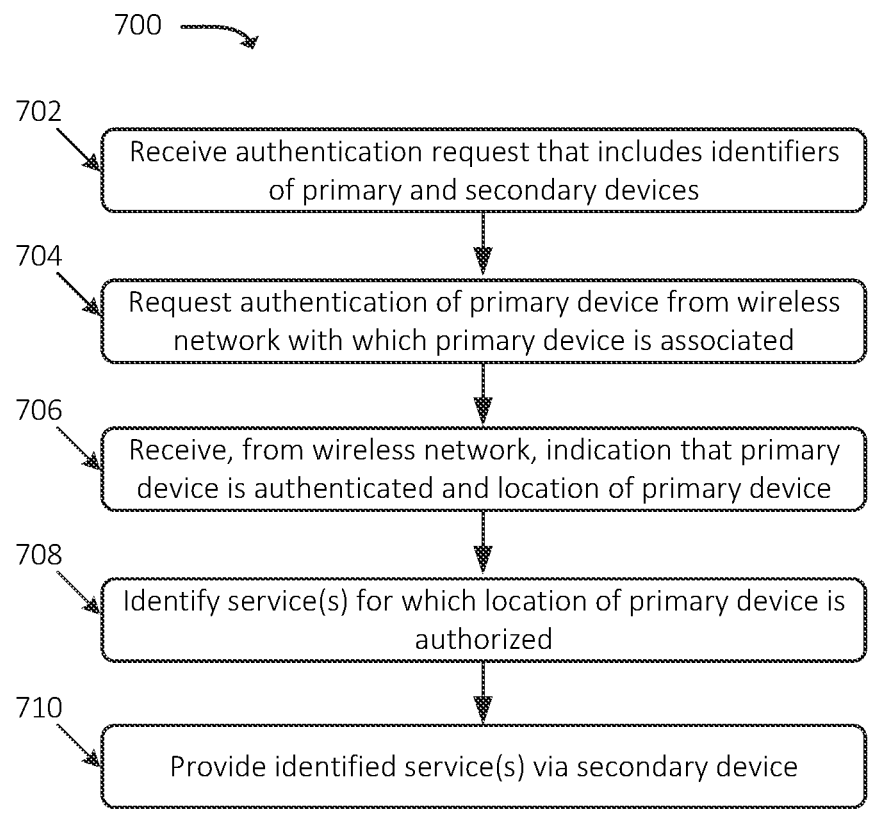
FIG. 7 illustrates an example process for a network-assisted authentication procedure of a secondary device, in accordance with some embodiments, in accordance with some embodiments.

FIG. 7 illustrates an example process 700 for a network-assisted authentication procedure of a secondary device, in accordance with some embodiments. In some embodiments, some or all of process 700 may be performed by service provider system 105. In some embodiments, one or more other devices may perform some or all of process 700 in concert with, and/or in lieu of, service provider system 105.

As shown, process 700 may include receiving (at 702) an authentication request that includes identifiers of primary and secondary devices. For example, service provider system 105 may receive an authentication request from primary device 103 or some other device or system, that includes an identifier of a particular secondary device 101. In some embodiments, the authentication request may include identifiers of particular content, applications, services, etc. for which access is being requested. For example, a user may have selected particular content, services, etc. out of a set of available content, services, etc. offered via secondary device 101, and secondary device 101 may indicate the selections to service provider system 105. As discussed above, primary device 103 may include a device that has been previously registered and/or authenticated with service provider system 105, such as a personal mobile phone associated with a particular user or account with respect to service provider system 105. In some embodiments, the identifier of primary device 103 may include an MDN of primary device 103 or some other suitable identifier. Service provider system 105 may use the identifier of primary device 103 to, for example, identify the user or account with which primary device 103 is associated. Different users or accounts of service provider system 105 may be associated with different available services, different profiles or preferences, etc.

In some embodiments, primary device 103 may utilize some other suitable mechanism for authenticating primary device 103 and/or identifying the user or account with which primary device 103 is associated. For example, in such embodiments, the authentication request may not necessarily include the identifier of primary device 103, and/or service provider system 105 may determine the user or account, with which primary device 103 is associated, in some other suitable manner or via some other suitable process.

As discussed above, the authentication request may include an identifier of secondary device 101, which may be provided by secondary device 101 to primary device 103 via a QR code, via proximity tap, via a display device of secondary device 101, and/or via some other suitable mechanism. As discussed above, secondary device 101 and service provider system 105 may have previously registered secondary device 101 with the identifier, such that service provider system 105 is able to distinguish between different secondary devices 101 on the basis of such identifier.

Process 700 may further include requesting (at 704) authentication of the primary device from a wireless network with which the primary device is associated. For example, service provider system 105 may communicate with wireless network 107 to authenticate primary device 103. In some embodiments, the authentication request (received at 702) may include an identifier of a particular wireless network 107 with which primary device 103 is associated, such as a PLMN identifier or other suitable identifier. Wireless network 107 may, for example, be a "home" network of primary device 103, with which primary device 103 has been registered or provisioned. Primary device 103 and/or wireless network 107 may maintain information indicating that wireless network 107 is the home network of primary device 103. Wireless network 107 may include an application function ("AF") or other suitable element that responds to authentication requests from authorized external systems (e.g., service provider system 105) in order to authenticate UEs registered with wireless network 107, where a particular UE may include or may otherwise be associated with primary device 103. As discussed above, service provider system 105 may communicate with such element of wireless network 107 via a NEF, SCEF, or other suitable interface or communication pathway. In some embodiments, service provider system 105 may communicate with some other device or system, external to wireless network 107, which provides for the network-assisted authentication provided herein. The network-assisted authentication mechanism may be used to verify the authenticity, location, or other suitable information regarding primary device 103.

Process 700 may additionally include receiving (at 706), from the wireless network, an indication that the primary device is authenticated as well as a location of the primary device. For example, service provider system 105 may receive, in response to the request (at 704) to wireless network 107 to authenticate primary device 103, an indication that primary device 103 has been authenticated by wireless network 107. The indication from wireless network 107 may include, in some embodiments, an indication of the location of primary device 103. In some embodiments, the indication from wireless network 107 may include an identifier of primary device 103, such as an MDN of primary device 103 (e.g., provided that a user of primary device 103 has indicated consent for such information to be shared between wireless network 107 and service provider system 105).

Process 700 may also include identifying (at 708) one or more services for which the primary device is authorized to receive, which may include identifying such services based on the location of the primary device. For example, as discussed above, primary device 103 may be associated with a particular account or user, for which a particular subset of services offered by service provider system 105 are authorized or otherwise available. For example, some users or accounts may have certain content available, which is not necessarily available to other users or accounts. Further, certain services, content, etc. offered by service provider system 105 may be available in some locations, but may be unavailable in other locations.

Process 700 may further include providing (at 710) the identified services via the secondary device. Since service provider system 105 has received authentication of primary device 103 as well as an indication that primary device 103 is associated with the authentication request for secondary device 101 (e.g., at 702), service provider system 105 may determine that secondary device 101 is authenticated with respect to the user or account with which primary device 103 is associated. Service provider system 105 may further assign the location of primary device 103 to secondary device 101, as it may be determined that the location of secondary device 101 is approximately the same as the location of primary device 103. For example, in situations where secondary device 101 provides the identifier of secondary device 101 to primary device 103 via a proximity-based technique (e.g., via a QR code, via an NFC tap, etc.), it may be assumed that the location of secondary device 101 may be set to the location of primary device 103. Since the network-assisted authentication procedure may be considered as reliable, the location of primary device 103 as received from network 107 may be used as the location of secondary device 101, thus preventing location spoofing or other types of malicious activity with respect to the location of secondary device 101 (e.g., attempting to gain services that are not authorized for the actual location of secondary device 101). Additionally, authenticating primary device 103 (and therefore secondary device 101) using a network-assisted authentication technique reduces the amount of user interaction needed (e.g., providing a user name or password) when the user wishes to access services via secondary device 101, thus improving the user experience of accessing services via secondary device 101.

As discussed above, the access via secondary device 101 may further be tailored to improve the security of the user as well as streamline the experience of other users. For example, the authentication of secondary device 101 may be dynamically configured, revoked, etc. based on estimated or actual amounts of time for which the authentication should remain active. In the example of a hotel scenario, the authentication of secondary device 101 may be valid for the duration of a first user's stay in a hotel room, and may be automatically invalidated (e.g., without the user's express interaction to do so, such as selecting a "logout" button) when the user checks out of the hotel room. For the next user staying in the same hotel room, the same secondary device

101 may be used for the same network-assisted authentication procedure, without the subsequent user having access to the previous user's account and further without requiring the subsequent user to log out of the previous user's account.

Figure 8:
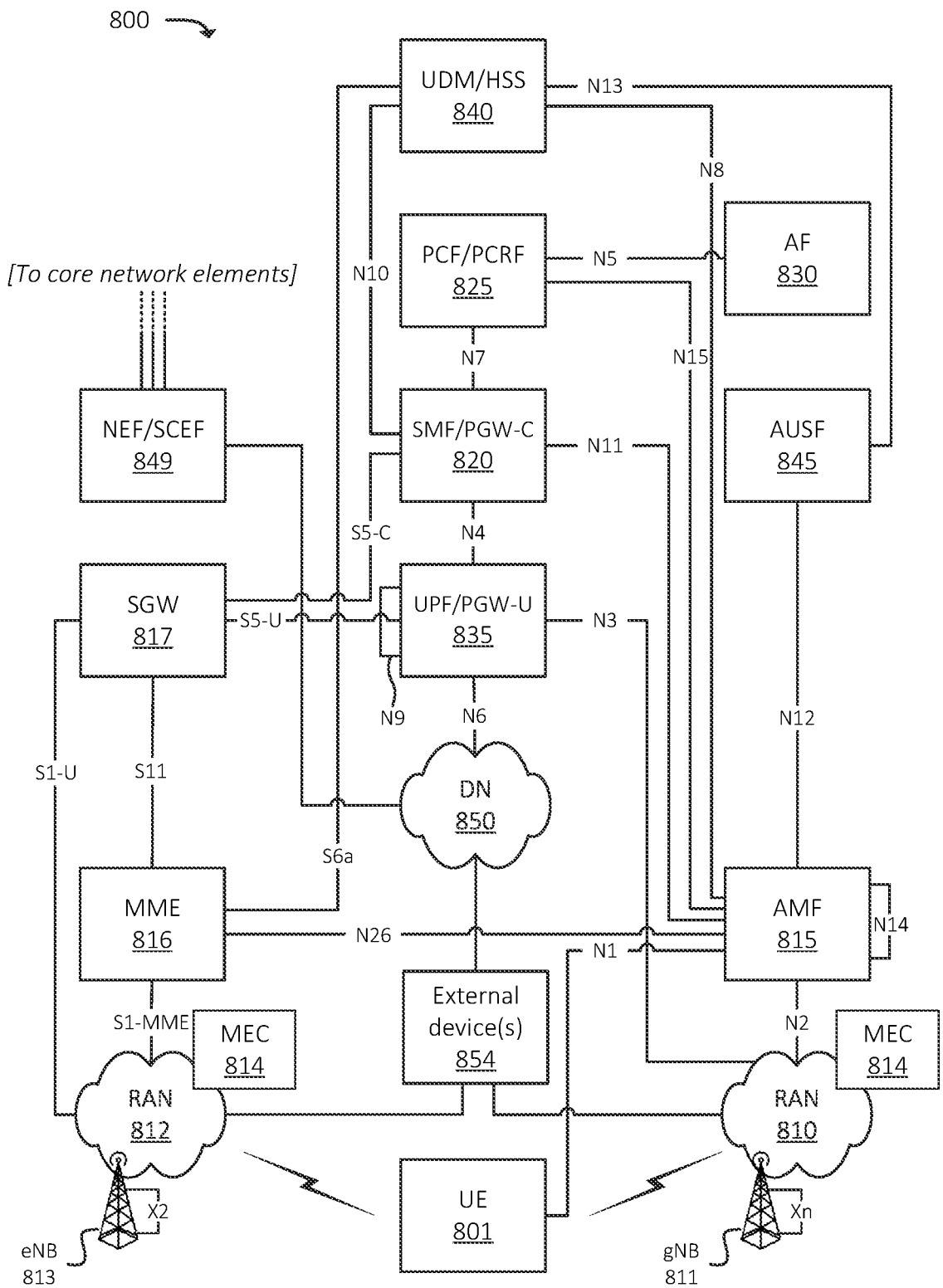
FIGS. 8 and 9 illustrate example environments in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 801, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, AF 830, User Plane Function ("UPF")/PGW-User plane function ("PGW-U") 835, Unified Data Management ("UDM")/Home Subscriber Server ("HSS") 840, Authentication Server Function ("AUSF") 845, and NEF/SCEF 849. Environment 800 may also include one or more networks, such as Data Network ("DN") 850. Environment 800 may include one or more additional devices or systems communicatively coupled to one or more networks (e.g., DN 850), such as one or more external devices 854.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 815, SMF/PGW-C 820, PCF/PCRF 825, and/or UPF/PGW-U 835, while another slice may include a second instance of AMF 815, SMF/PGW-C 820, PCF/PCRF 825, and/or UPF/PGW-U 835). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Additionally, one or more elements of environment 800 may be implemented in a virtualized and/or containerized manner. For example, one or more of the elements of environment 800 may be implemented by one or more Virtualized Network Functions ("VNFs"), Cloud-Native Network Functions ("CNFs"), etc. In such embodiments, environment 800 may include, may implement, and/or may be communicatively coupled to an orchestration platform that provisions hardware resources, installs containers or applications, performs load balancing, and/or otherwise manages the deployment of such elements of environment 800. In some embodiments, such orchestration and/or management of such elements of environment 800 may be performed by, or in conjunction with, the open-source Kubernetes® application programming interface ("API") or some other suitable virtualization, containerization, and/or orchestration system.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 800 may be, may include, may be implemented by, and/or may be communicatively coupled to wireless network 107.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 801 may send traffic to and/or receive traffic (e.g., user plane traffic) from DN 850 via RAN 810, RAN 812, and/or UPF/PGW-U 835. In some embodiments, UE 801 may include, may implement, may be communicatively coupled to, and/or may otherwise be associated with one or more primary devices 103 and/or secondary devices 101.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., user plane traffic such as voice call traffic, data traffic, messaging traffic, etc.) from UE 801 via the air interface, and may communicate the traffic to UPF/PGW-U 835 and/or one or more other devices or networks. Further, RAN 810 may receive signaling traffic, control plane traffic, etc. from UE 801 via the air interface, and may communicate such signaling traffic, control plane traffic, etc. to AMF 815 and/or one or more other devices or networks. Additionally, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 801 via the air interface, and may communicate the traffic to UPF/PGW-U 835 (e.g., via SGW 817) and/or one or more other devices or networks. Further, RAN 812 may receive signaling traffic, control plane traffic, etc. from UE 801 via the air interface, and may communicate such signaling traffic, control plane traffic, etc. to MME 816 and/or one or more other devices or networks. Additionally, RAN 812 may receive traffic intended for UE 801 (e.g., from UPF/PGW-U 835, MME 816, SGW 817, and/or one or more other devices or networks) and may communicate the traffic to UE 801 via the air interface.

One or more RANs of environment 800 (e.g., RAN 810 and/or RAN 812) may include, may implement, and/or may otherwise be communicatively coupled to one or more edge computing devices, such as one or more Multi-Access/Mobile Edge Computing ("MEC") devices (referred to sometimes herein simply as a "MECs") 814. MECs 814 may be co-located with wireless network infrastructure equipment of RANs 810 and/or 812 (e.g., one or more gNBs 811 and/or one or more eNBs 813, respectively). Additionally, or alternatively, MECs 814 may otherwise be associated with geographical regions (e.g., coverage areas) of wireless network infrastructure equipment of RANs 810 and/or 812. In some embodiments, one or more MECs 814 may be implemented by the same set of hardware resources, the same set of devices, etc. that implement wireless network infrastructure equipment of RANs 810 and/or 812. In some embodiments, one or more MECs 814 may be implemented by different hardware resources, a different set of devices, etc. from hardware resources or devices that implement wireless network infrastructure equipment of RANs 810 and/or 812. In some embodiments, MECs 814 may be communicatively coupled to wireless network infrastructure equipment of RANs 810 and/or 812 (e.g., via a high-speed and/or low-latency link such as a physical wired interface, a high-speed and/or low-latency wireless interface, or some other suitable communication pathway).

MECs 814 may include hardware resources (e.g., configurable or provisionable hardware resources) that may be configured to provide services and/or otherwise process traffic to and/or from UE 801, via RAN 810 and/or 812. For example, RAN 810 and/or 812 may route some traffic from UE 801 (e.g., traffic associated with one or more particular services, applications, application types, etc.) to a respective MEC 814 instead of to core network elements of 800 (e.g., UPF/PGW-U 835). MEC 814 may accordingly provide services to UE 801 by processing such traffic, performing one or more computations based on the received traffic, and providing traffic to UE 801 via RAN 810 and/or 812. MEC 814 may include, and/or may implement, some or all of the functionality described above with respect to UPF/PGW-U 835, AF 830, one or more application servers, and/or one or more other devices, systems, VNFs, CNFs, etc. In this manner, ultra-low latency services may be provided to UE 801, as traffic does not need to traverse links (e.g., backhaul links) between RAN 810 and/or 812 and the core network.

AMF 815 may include one or more devices, systems, VNFs, CNFs, etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple instances of UPF/PGW-U

835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. In some embodiments, UDM/HSS 840 may include, may implement, may be communicatively coupled to, and/or may otherwise be associated with some other type of repository or database, such as a Unified Data Repository ("UDR"). AUSF 845 and/or UDM/HSS 840 may perform authentication, authorization, and/or accounting operations associated with one or more UEs 801 and/or one or more communication sessions associated with one or more UEs 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

External devices 854 may include one or more devices or systems that communicate with UE 801 via 850 and one or more elements of 800 (e.g., via UPF/PGW-U 835). In some embodiments, external device 854 may include, may implement, and/or may otherwise be associated with service provider system 105, secondary device 101, and/or secondary device management system 401. External devices 854 may include, for example, one or more application servers, content provider systems, web servers, or the like. External devices 854 may, for example, implement "server-side" applications that communicate with "client-side" applications executed by UE 801. External devices 854 may provide services to UE 801 such as gaming services, videoconferencing services, messaging services, email services, web services, and/or other types of services.

In some embodiments, external devices 854 may communicate with one or more elements of environment 800 (e.g., core network elements) via NEF/SCEF 849. NEF/SCEF 849 include one or more devices, systems, VNFs, CNFs, etc. that provide access to information, APIs, and/or other operations or mechanisms of one or more core network elements to devices or systems that are external to the core network (e.g., to external device 854 via DN 850). NEF/SCEF 849 may maintain authorization and/or authentication information associated with such external devices or systems, such that NEF/SCEF 849 is able to provide information, that is authorized to be provided, to the external devices or systems. For example, a given external device 854 may request particular information associated with one or more core network elements. NEF/SCEF 849 may authenticate the request and/or otherwise verify that external device 854 is authorized to receive the information, and may request, obtain, or otherwise receive the information from the one or more core network elements. In some embodiments, NEF/SCEF 849 may include, may implement, may be implemented by, may be communicatively coupled to, and/or may otherwise be associated with a Security Edge Protection Proxy ("SEPP"), which may perform some or all of the functions discussed above. External device 854 may, in some situations, subscribe to particular types of requested information provided by the one or more core network elements, and the one or more core network elements may provide (e.g., "push") the requested information to NEF/SCEF 849 (e.g., in a periodic or otherwise ongoing basis).

In some embodiments, external devices 854 may communicate with one or more elements of RAN 810 and/or 812 via an API or other suitable interface. For example, a given external device 854 may provide instructions, requests, etc. to RAN 810 and/or 812 to provide one or more services via one or more respective MECs 814. In some embodiments, such instructions, requests, etc. may include QoS parameters, Service Level Agreements ("SLAs"), etc. (e.g., maximum latency thresholds, minimum throughput thresholds, etc.) associated with the services.

Figure 9:
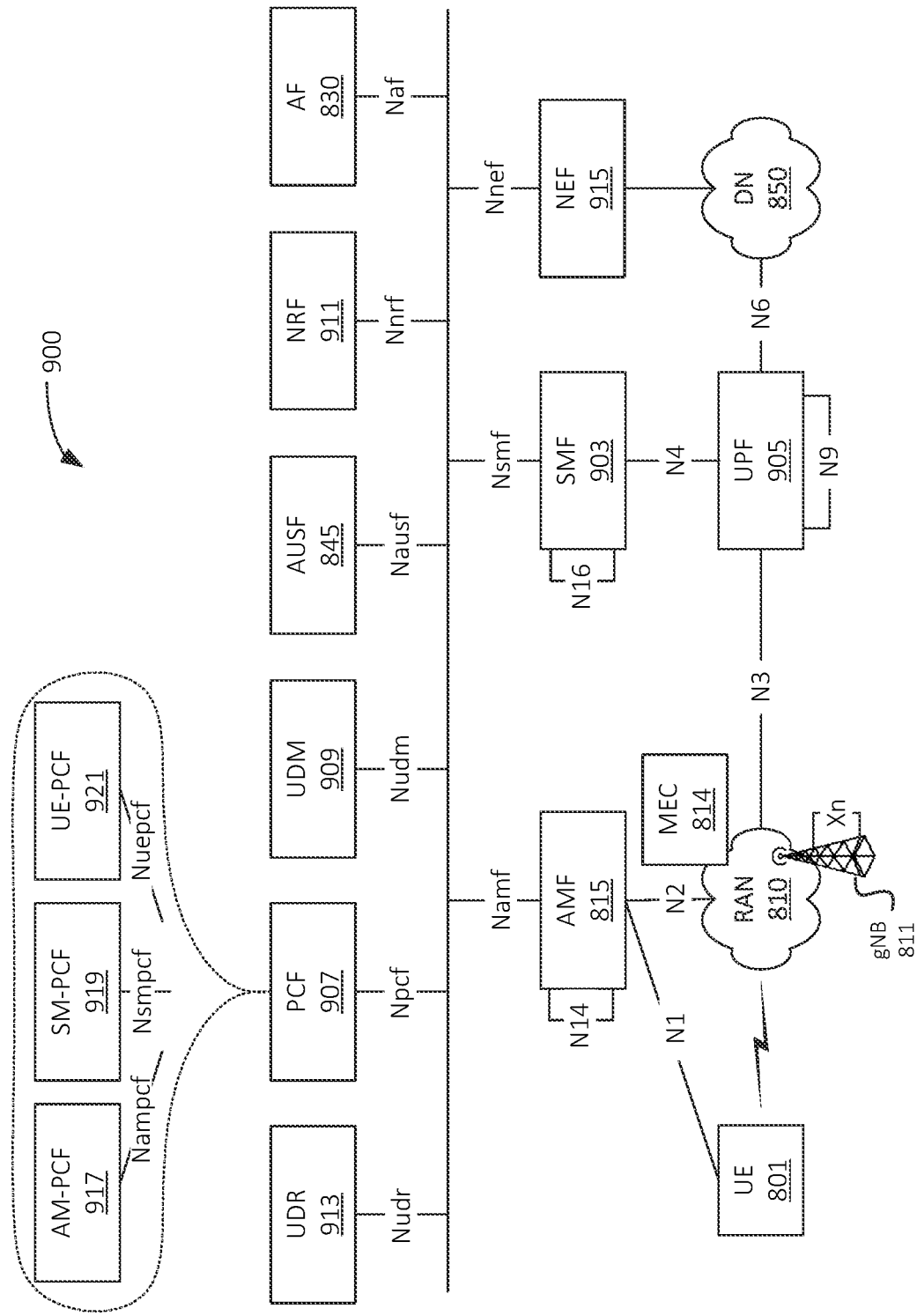

FIG. 9 illustrates another example environment 900, in which one or more embodiments may be implemented. In some embodiments, environment 900 may correspond to a 5G network, and/or may include elements of a 5G network. In some embodiments, environment 900 may correspond to a 5G SA architecture. In some embodiments, environment 900 may include a 5GC, in which 5GC network elements perform one or more operations described herein.

As shown, environment 900 may include UE 801, RAN 810 (which may include one or more gNBs 811 or other types of wireless network infrastructure) and various network functions, which may be implemented as VNFs, CNFs, etc. Such network functions may include AMF 815, SMF 903, UPF 905, PCF 907, UDM 909, AUSF 845, Network Repository Function ("NRF") 911, AF 830, UDR 913, and NEF 915. Environment 900 may also include or may be communicatively coupled to one or more networks, such as Data Network DN 850.

The example shown in FIG. 9 illustrates one instance of each network component or function (e.g., one instance of SMF 903, UPF 905, PCF 907, UDM 909, AUSF 845, etc.). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF 903, PCF 907, UPF 905, etc., while another slice may include a second instance of SMF 903, PCF 907, UPF 905, etc.). Additionally, or alternatively, one or more of the network functions of environment 900 may implement multiple network slices. The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Elements of environment 900 may interconnect with each other and/or other devices via wired connections, wireless connections, or a combination of wired and wireless connections. Examples of interfaces or communication pathways between the elements of environment 900, as shown in FIG. 9, may include interfaces shown in FIG. 9 and/or one or more interfaces not explicitly shown in FIG. 9. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 900 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 815), an Nudm interface (e.g., indicating communications to be routed to UDM 909), an Npcf interface, an Nupf interface, an Nnef interface, an Nsmf interface, an Nnrf interface, an Nudr interface, an Naf interface, and/or one or more other SBIs. In some embodiments, environment 900 may be, may include, may be implemented by, and/or may be communicatively coupled to network 107.

UPF 905 may include one or more devices, systems, VNFs, CNFs, etc., that receive, route, process, and/or forward traffic (e.g., user plane traffic). As discussed above, UPF 905 may communicate with UE 801 via one or more communication sessions, such as PDU sessions. Such PDU sessions may be associated with a particular network slice or other suitable QoS parameters, as noted above. UPF 905 may receive downlink user plane traffic (e.g., voice call traffic, data traffic, etc. destined for UE 801) from DN 850, and may forward the downlink user plane traffic toward UE 801 (e.g., via RAN 810). In some embodiments, multiple UPFs 905 may be deployed (e.g., in different geographical locations), and the delivery of content to UE 801 may be coordinated via the N9 interface. Similarly, UPF 905 may receive uplink traffic from UE 801 (e.g., via RAN 810), and may forward the traffic toward DN 850. In some embodiments, UPF 905 may implement, may be implemented by, may be communicatively coupled to, and/or may otherwise be associated with UPF/PGW-U 835. In some embodiments, UPF 905 may communicate (e.g., via the N4 interface) with SMF 903, regarding user plane data processed by UPF 905 (e.g., to provide analytics or reporting information, to receive policy and/or authorization information, etc.).

PCF 907 may include one or more devices, systems, VNFs, CNFs, etc., that aggregate, derive, generate, etc. policy information associated with the 5GC and/or UEs 801 that communicate via the 5GC and/or RAN 810. PCF 907 may receive information regarding policies and/or subscriptions from one or more sources, such as subscriber databases (e.g., UDM 909, UDR 913, etc.), and/or from one or more users such as, for example, an administrator associated with PCF 907. In some embodiments, the functionality of PCF 907 may be split into multiple network functions or subsystems, such as access and mobility PCF ("AM-PCF") 917, session management PCF ("SM-PCF") 919, UE PCF ("UE-PCF") 921, and so on. Such different "split" PCFs may be associated with respective SBIs (e.g., AM-PCF 917 may be associated with an Nampcf SBI, SM-PCF 919 may be associated with an Nsmpcf SBI, UE-PCF 921 may be associated with an Nuepcf SBI, and so on) via which other network functions may communicate with the split PCFs. The split PCFs may maintain information regarding policies associated with different devices, systems, and/or network functions.

NRF 911 may include one or more devices, systems, VNFs, CNFs, etc. that maintain routing and/or network topology information associated with the 5GC. For example, NRF 911 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 913 may include one or more devices, systems, VNFs, CNFs, etc. that provide user and/or subscriber information, based on which PCF 907 and/or other elements of environment 900 may determine access policies, QoS policies, charging policies, or the like. In some embodiments, UDR 913 may receive such information from UDM 909 and/or one or more other sources.

NEF 915 include one or more devices, systems, VNFs, CNFs, etc. that provide access to information, APIs, and/or other operations or mechanisms of the 5GC to devices or systems that are external to the 5GC. NEF 915 may maintain authorization and/or authentication information associated with such external devices or systems, such that NEF 915 is able to provide information, that is authorized to be provided, to the external devices or systems. Such information may be received from other network functions of the 5GC (e.g., as authorized by an administrator or other suitable entity associated with the 5GC), such as SMF 903, UPF 905, a charging function ("CHF") of the 5GC, and/or other suitable network function. NEF 915 may communicate with external devices or systems (e.g., external devices 854) via DN 850 and/or other suitable communication pathways.

While environment 900 is described in the context of a 5GC, as noted above, environment 900 may, in some embodiments, include or implement one or more other types of core networks. For example, in some embodiments, environment 900 may be or may include a converged packet core, in which one or more elements may perform some or all of the functionality of one or more 5GC network functions and/or one or more EPC network functions. For example, in some embodiments, AMF 815 may include, may implement, may be implemented by, and/or may otherwise be associated with MME 816; SMF 903 may include, may implement, may be implemented by, and/or may otherwise be associated with SGW 817; PCF 907 may include, may implement, may be implemented by, and/or may otherwise be associated with a PCRF (e.g., PCF/PCRF 825); NEF 915 may include, may implement, may be implemented by, and/or may otherwise be associated with a SCEF (e.g., NEF/SCEF 849); and so on.

Figure 10:
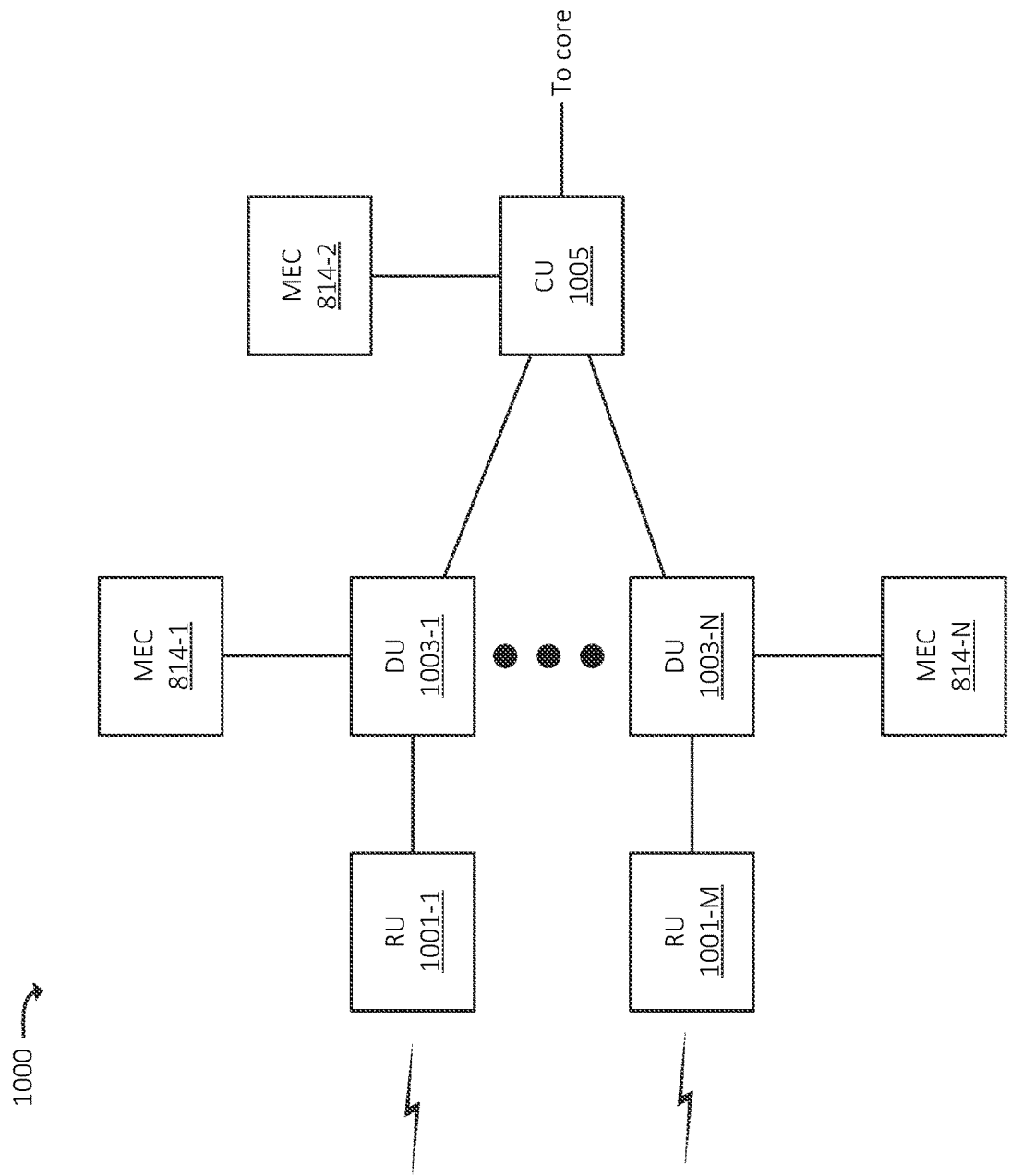
FIG. 10 illustrates an example arrangement of a radio access network ("RAN"), in accordance with some embodiments.

FIG. 10 illustrates an example RAN environment 1000, which may be included in and/or implemented by one or more RANs (e.g., RAN 810 or some other RAN). In some embodiments, a particular RAN 810 may include one RAN environment 1000. In some embodiments, a particular RAN 810 may include multiple RAN environments 1000. In some embodiments, RAN environment 1000 may correspond to a particular gNB 811 of RAN 810. In some embodiments, RAN environment 1000 may correspond to multiple gNBs 811. In some embodiments, RAN environment 1000 may correspond to one or more other types of base stations of one or more other types of RANs. As shown, RAN environment 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 815 and/or UPF 905). In the uplink direction (e.g., for traffic from UEs 801 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 801, and may determine which DU(s) 1003 should receive the downlink traffic. DU 1003 may include one or more devices that transmit traffic between a core network (e.g., via CU 1005) and UE 801 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 801.

RU 1001 may include hardware circuitry (e.g., one or more RF transceivers, antennas, radios, and/or other suitable hardware) to communicate wirelessly (e.g., via an RF interface) with one or more UEs 801, one or more other DUs 1003 (e.g., via RUs 1001 associated with DUs 1003), and/or any other suitable type of device. In the uplink direction, RU 1001 may receive traffic from UE 801 and/or another DU 1003 via the RF interface and may provide the traffic to DU 1003. In the downlink direction, RU 1001 may receive traffic from DU 1003, and may provide the traffic to UE 801 and/or another DU 1003.

One or more elements of RAN environment 1000 may, in some embodiments, be communicatively coupled to one or more MECs 814. For example, DU 1003-1 may be communicatively coupled to MEC 814-1, DU 1003-N may be communicatively coupled to MEC 814-N, CU 1005 may be communicatively coupled to MEC 814-2, and so on. MECs 814 may include hardware resources (e.g., configurable or provisionable hardware resources) that may be configured to provide services and/or otherwise process traffic to and/or from UE 801, via a respective RU 1001.

For example, DU 1003-1 may route some traffic, from UE 801, to MEC 814-1 instead of to a core network via CU 1005. MEC 814-1 may process the traffic, perform one or more computations based on the received traffic, and may provide traffic to UE 801 via RU 1001-1. As discussed above, MEC 814 may include, and/or may implement, some or all of the functionality described above with respect to UPF 905, AF 830, and/or one or more other devices, systems, VNFs, CNFs, etc. In this manner, ultra-low latency services may be provided to UE 801, as traffic does not need to traverse DU 1003, CU 1005, links between DU 1003 and CU 1005, and an intervening backhaul network between RAN environment 1000 and the core network.

Figure 11:
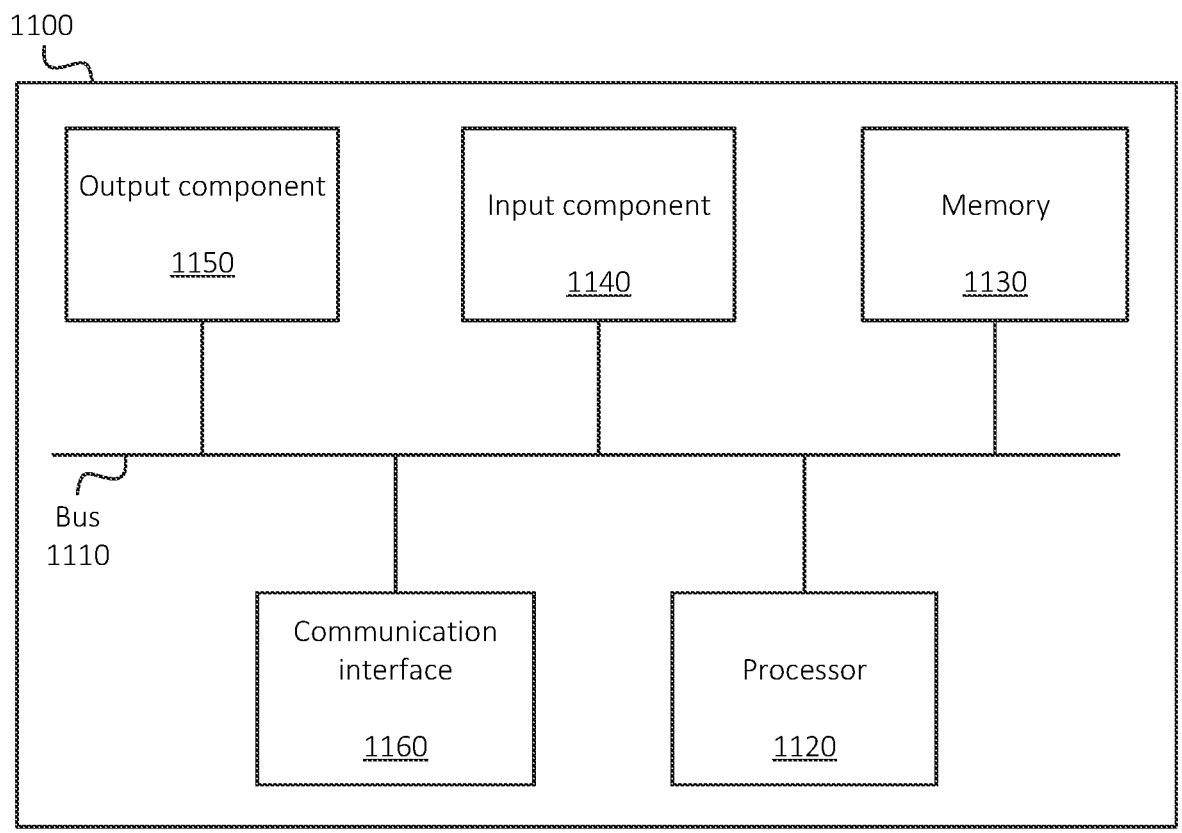
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, a set of provisioned hardware resources of a cloud computing system, or other suitable type of hardware that interprets and/or executes instructions (e.g., processor-executable instructions). In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems (e.g., via RAN 810, RAN 812, DN 850, etc.). For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1100 may include more than one communication interface 1160. For instance, device 1100 may include an optical interface, a wireless interface, an Ethernet interface, and/or one or more other interfaces.

Device 1100 may perform certain operations relating to one or more processes described above. Device 1100 may perform these operations in response to processor 1120 executing instructions, such as software instructions, processor-executable instructions, etc. stored in a computer-readable medium, such as memory 1130. A computer-readable medium may be defined as a non-transitory memory device. A memory device may include space within a single physical memory device or spread across multiple physical memory devices. The instructions may be read into memory 1130 from another computer-readable medium or from another device. The instructions stored in memory 1130 may be processor-executable instructions that cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
one or more hardware processors configured to:
 receive a first authentication request that includes:
  a first identifier of a User Equipment ("UE"), and
  a second identifier of a second device;
 output a second authentication request to a wireless network with which the UE is associated, wherein the authentication request includes the first identifier of the UE;
 receive, in response to the second authentication request:
  an indication that the UE has been authenticated, and
  location information associated with the UE;
 maintain a set of content available for providing to one or more UEs, wherein different subsets of the content are associated with different locations;
 identify one or more services associated with the received location of the UE, wherein identifying the one or more services associated with the location of the UE includes identifying a particular subset of the content associated with the location of the UE; and
 output, to the second device and based on the response to the second authentication request, traffic associated with the identified one or more services, wherein outputting the traffic associated with the identified one or more services includes providing the particular subset of content, associated with the location of the UE, to the second device.

2. The first device of claim 1, wherein the UE is associated with a particular user or account, wherein the one or more hardware processors are further configured to: identify that the first authentication request is associated with the particular user or account based on the first identifier of the UE received with the first authentication request.

3. The first device of claim 2, wherein identifying the one or more services further includes identifying a set of services associated with the particular user or account.

4. The first device of claim 1, wherein the first identifier of the UE includes a Mobile Directory Number ("MDN") of the UE.

5. The first device of claim 1, wherein the first authentication request is received from the UE, and wherein the second device provides the second identifier to the UE.

6. A first device, comprising:
one or more hardware processors configured to:
receive a first authentication request that includes:
a first identifier of a User Equipment ("UE"), and
a second identifier of a second device;
output a second authentication request to a wireless network with which the UE is associated, wherein the authentication request includes the first identifier of the UE;
receive, in response to the second authentication request:
an indication that the UE has been authenticated, and location information associated with the UE;
identify one or more services associated with the received location of the UE;
output, to the second device and based on the response to the second authentication request, traffic associated with the identified one or more services;
receive scheduling information associated with the fust UE;
determine, based on the scheduling information associated with the fust UE, that authentication of the second device has expired; and
cease outputting, to the second device and based on determining that the authentication of the second device has expired, traffic associated with the identified one or more services.

7. The first device of claim 6, wherein the first identifier of the UE includes a Mobile Directory Number ("MDN") of the UE.

8. The first device of claim 6, wherein the first authentication request is received from the UE, and wherein the second device provides the second identifier to the UE.

9. The first device of claim 6, wherein the UE is associated with a particular user or account, the method further comprising:
identifying that the first authentication request is associated with the particular user or account based on the first identifier of the UE received with the first authentication request,
wherein identifying the one or more services further includes identifying a set of services associated with the particular user or account.

10. A non-transitory computer-readable medium, storing a plurality of processor-executable instructions to:
receive a first authentication request that includes:
a first identifier of a User Equipment ("UE"), and
a second identifier of a device;
output a second authentication request to a wireless network with which the UE is associated, wherein the authentication request includes the first identifier of the UE;
receive, in response to the second authentication request:
an indication that the UE has been authenticated, and location information associated with the UE;
maintain a set of content available for providing to one or more UEs, wherein different subsets of the content are associated with different locations;
identify one or more services associated with the received location of the UE, wherein identifying the one or more services associated with the location of the UE includes identifying a particular subset of the content associated with the location of the UE; and
output, to the device and based on the response to the second authentication request, traffic associated with the identified one or more services, wherein outputting the traffic associated with the identified one or more services includes providing the particular subset of content, associated with the location of the UE, to the device.

11. The non-transitory computer-readable medium of claim 10, wherein the UE is associated with a particular user or account, wherein the plurality of processor-executable instructions further include processor-executable instructions to:
identify that the first authentication request is associated with the particular user or account based on the first identifier of the UE received with the first authentication request.

12. The non-transitory computer-readable medium of claim 11, wherein identifying the one or more services further includes identifying a set of services associated with the particular user or account.

13. The non-transitory computer-readable medium of claim 10, wherein the first identifier of the UE includes a Mobile Directory Number ("MDN") of the UE.

14. The non-transitory computer-readable medium of claim 10, wherein the first authentication request is received from the UE, and wherein the device provides the second identifier to the UE.

15. The non-transitory computer-readable medium of claim 10, wherein the plurality of processor-executable instructions further include processor-executable instructions to:
receive scheduling information associated with the UE;
determine, based on the scheduling information associated with the UE, that authentication of the device has expired; and
cease outputting, to the device and based on determining that the authentication of the device has expired, traffic associated with the identified one or more services.

16. A method, comprising:
receiving a first authentication request that includes:
a first identifier of a User Equipment ("UE"), and
a second identifier of a device;
outputting a second authentication request to a wireless network with which the UE is associated, wherein the authentication request includes the first identifier of the UE;
receiving, in response to the second authentication request:
an indication that the UE has been authenticated, and location information associated with the UE;
maintaining a set of content available for providing to one or more UEs, wherein different subsets of the content are associated with different locations;
identifying one or more services associated with the received location of the UE, wherein identifying the one or more services associated with the location of the UE includes identifying a particular subset of the content associated with the location of the UE; and
outputting, to the device and based on the response to the second authentication request, traffic associated with the identified one or more services-, wherein outputting the traffic associated with the identified one or more services includes providing the particular subset of content, associated with the location of the UE, to the device.

17. The method of claim 16, wherein the UE is associated with a particular user or account, the method further comprising:
- identifying that the first authentication request is associated with the particular user or account based on the first identifier of the UE received with the first authentication request,
- wherein identifying the one or more services further includes identifying a set of services associated with the particular user or account.

18. The method of claim 16, wherein the first identifier of the UE includes a Mobile Directory Number ("MDN") of the UE.

19. The method of claim 16, wherein the first authentication request is received from the UE, and wherein the UE receives the second identifier from the device.

20. The method of claim 16, further comprising:
- receiving scheduling information associated with the UE;
- determining, based on the scheduling information associated with the UE, that authentication of the device has expired; and
- ceasing outputting, to the device and based on determining that the authentication of the device has expired, traffic associated with the identified one or more services.

* * * * *